(12) United States Patent
Wang

(10) Patent No.: US 8,317,355 B1
(45) Date of Patent: *Nov. 27, 2012

(54) SOLAR UMBRELLA CLIP LIGHT

(75) Inventor: Shooupyng Wang, Ft. Lauderdale, FL (US)

(73) Assignee: Chien Luen Industries Co., Ltd., Inc., Oakland Park, FL (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/625,116

(22) Filed: Nov. 24, 2009

(51) Int. Cl.
*F21L 4/08* (2006.01)
*A45B 3/02* (2006.01)

(52) U.S. Cl. ......... 362/183; 362/102; 362/191; 362/396

(58) Field of Classification Search .................. 362/183, 362/190, 191, 196, 197, 199, 200, 287, 396, 362/419, 427, 102, 276, 802; 248/231.51, 248/231.71, 231.81, 316.5, 316.7, 689; 135/15.1, 135/16

See application file for complete search history.

(56) References Cited

U.S. PATENT DOCUMENTS

| | | | |
|---|---|---|---|
| 4,392,187 A | 7/1983 | Bornhorst | |
| 5,055,984 A | 10/1991 | Hung | |
| 6,135,605 A * | 10/2000 | Hsu et al. ...................... | 362/102 |
| 6,619,813 B1 | 9/2003 | Schnell | |
| 6,837,255 B2 | 1/2005 | Bunch | |
| 7,000,624 B2 | 2/2006 | Chang | |
| 7,344,286 B1 * | 3/2008 | Petrie et al. .................... | 362/391 |
| 7,513,660 B2 * | 4/2009 | Spartano et al. .............. | 362/373 |
| 7,703,952 B2 * | 4/2010 | Yoon .............................. | 362/396 |
| 8,069,868 B2 * | 12/2011 | Kuelbs ............................ | 135/16 |
| 2002/0074027 A1 | 6/2002 | Maidment | |
| 2002/0131263 A1 | 9/2002 | Naghi | |
| 2003/0008720 A1 | 1/2003 | Wheat | |
| 2004/0020522 A1 | 2/2004 | James | |
| 2004/0228124 A1 | 11/2004 | Reiff | |
| 2006/0219472 A1 | 10/2006 | Vance | |
| 2006/0227540 A1 | 10/2006 | Sohn | |
| 2007/0109768 A1 | 5/2007 | Sohn | |
| 2007/0212931 A1 | 9/2007 | Livingston | |
| 2007/0242450 A1 | 10/2007 | Blatecky | |

* cited by examiner

*Primary Examiner* — Thomas Sember
(74) *Attorney, Agent, or Firm* — Brian S. Steinberger; Law Offices of Brian S. Steinberger, P.A.

(57) ABSTRACT

Portable solar powered light sources, devices, apparatus, systems and methods of attaching and using the light source. The light sources can have a single small housing having an upper roof portion with an exposed solar cell, a photocell activator, and small housing. The housing can have two parts that pivot with one another so that a front end of the housing can be biased together by a spring, and the rear side having edges that are spaced apart. An operator can press the rear spaced apart edges together, to open the front end to slide about a support structure, such as an open umbrella fabric edge. The housing allows for the light source powered by batteries to be activated by the photocell during dark (night) conditions), with the light direction being adjustable underneath. During daylight, the solar cell receives sunlight to charge the batteries within the housing.

11 Claims, 15 Drawing Sheets

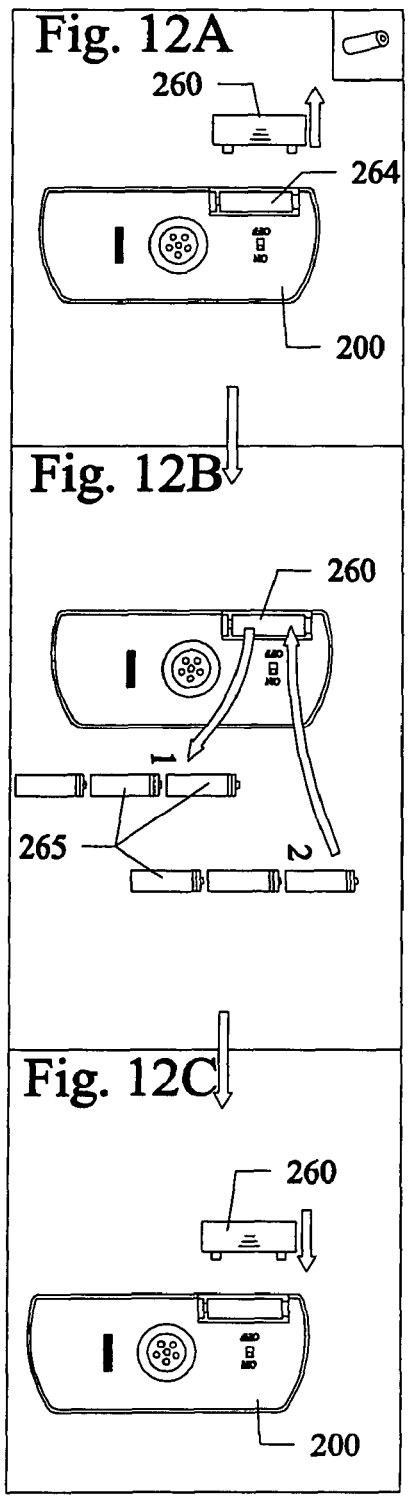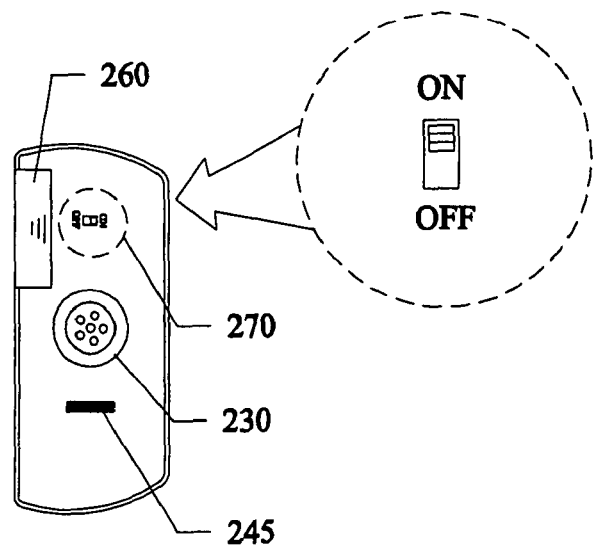

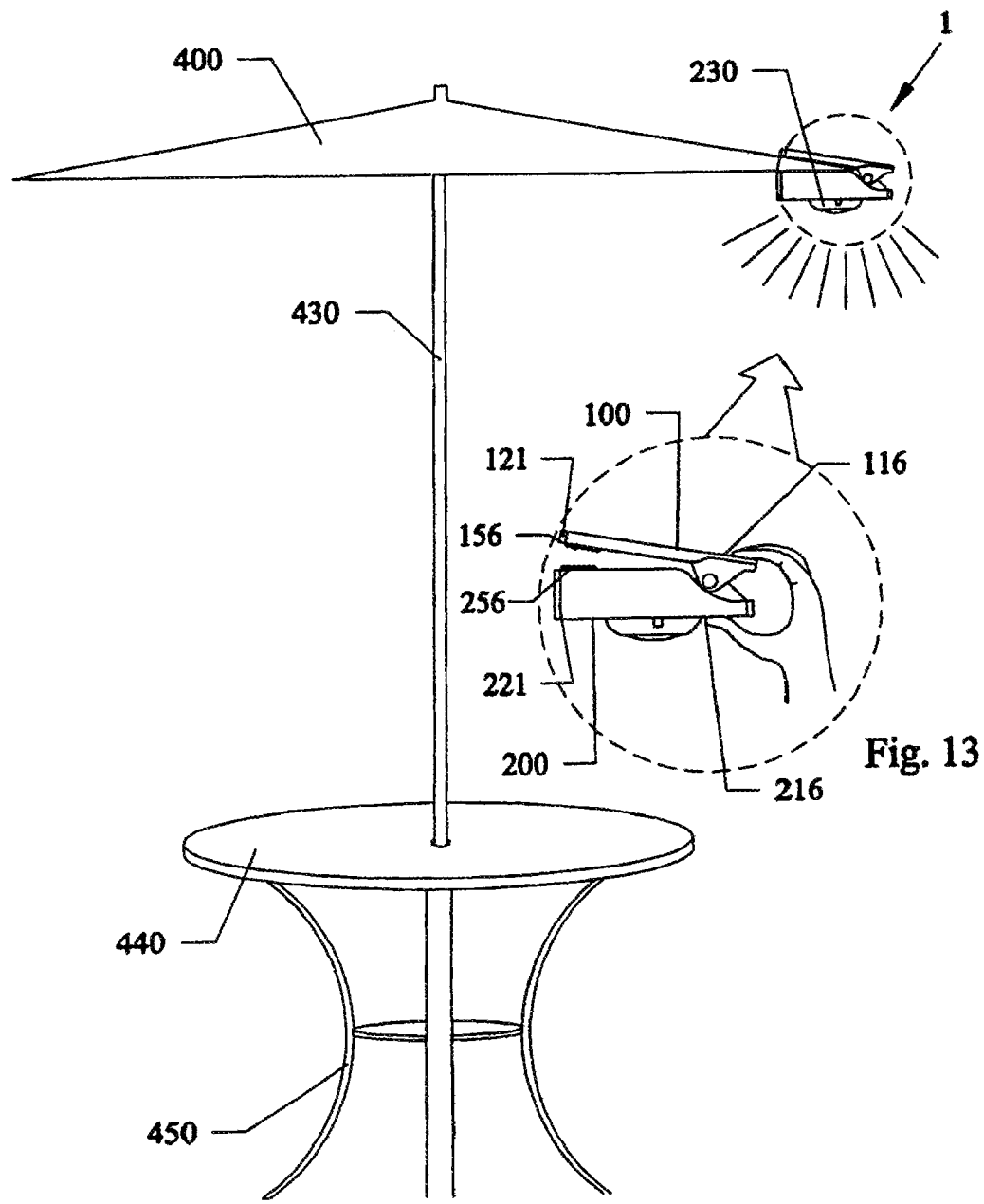

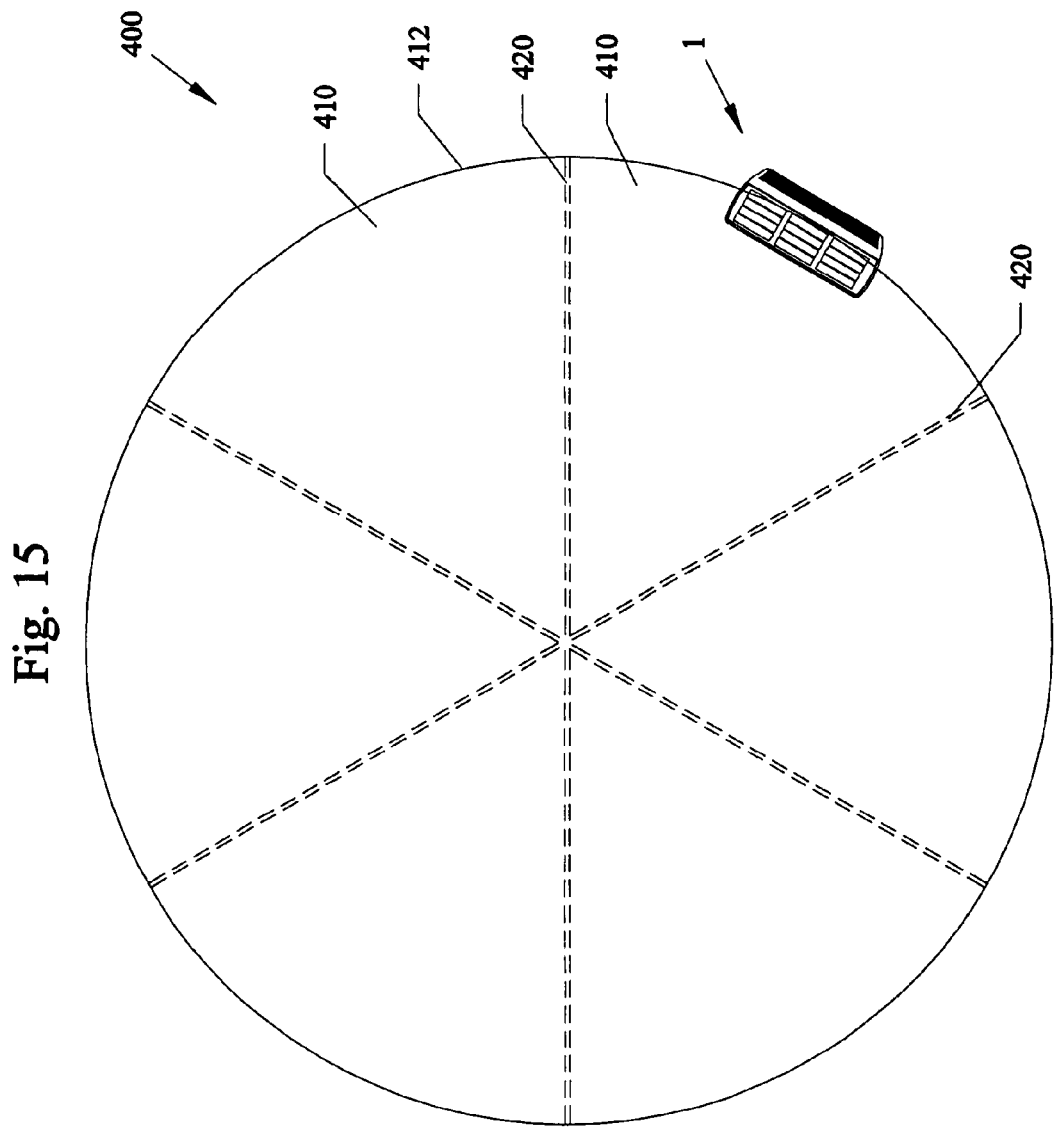

SOLAR UMBRELLA CLIP LIGHT

This invention relates to lights, in particular to apparatus, devices and methods of attaching portable solar powered lights to outdoor umbrellas, tree branches, and manmade structures such as but not limited to porches, balconies, gazebos, and the like.

BACKGROUND AND PRIOR ART

Outdoor umbrellas, such as table umbrellas, beach umbrellas and the like, are popular for daytime activities, but can create shadows underneath that take away from their productive use. Furthermore, large table umbrellas, and beach umbrellas are often left in up positions after dark, which makes the space underneath difficult to illuminate. Providing artificial illumination sources such as candles, are easy to use, but must be handled with care since the flames can burn the umbrella. Popular electrically powered lights such as those formed from stringing electrical lines to power small lights and the like, can also be difficult to use, and are not practical in outdoor environments that have no power supplies in close proximity to the umbrellas.

Over the years various light sources have been proposed for lighting umbrellas. See for example, U.S. Pat. Nos. 6,837,255 to Bunch et al. and 7,000,624 to Chang, and U.S. Patent Applications: 2002/0074027 to Maidment.

The Bunch '255 patent and Chang '624 Published patent application and Maidment '027 published patent application each describes umbrellas with light sources, that requires electrical lines and the light sources be inserted into rib support arms and poles of an umbrella, where the light sources must be carefully inserted into the umbrella parts, and are not easily removable.

U.S. Published Patent Application 2006/0227540 to Sohn describes a removable clip type light. However, the Sohn publication requires the use of batteries which would not last for long time periods and would need replacement over time. Additionally, the lights point forward, and would not be useful for lighting an area beneath an umbrella. Additionally, the clip part of the light is not expandable and would only be able to slide about a narrow material, such as a hat visor, which is described as an intended use of this light.

Still furthermore, the light sources referenced above are fixed, and cannot be moved to adjust the light beam once the lights are installed in place.

The inventor is not aware of apparatus, devices and methods that overcome all the problems listed above. Thus, the need exists for solutions to the above problems with the prior art.

SUMMARY OF THE INVENTION

A primary objective of the present invention is to provide illumination apparatus, devices and methods of attaching lights to outdoor umbrellas, tree branches, porches, balconies, gazebos, clothes, and the like, that is solar powered.

A secondary objective of the present invention is to provide illumination apparatus, devices and methods of attaching lights to outdoor umbrellas, tree branches, porches, balconies, gazebos, clothes, and the like, having rechargeable batteries.

A third objective of the present invention is to provide illumination apparatus, devices and methods of attaching lights to outdoor umbrellas, tree branches, porches, balconies, gazebos, and the like, that requires no external electrical power supply and wiring to use.

A fourth objective of the present invention is to provide illumination apparatus, devices and methods of attaching lights to outdoor umbrellas, tree branches, porches, balconies, gazebos, and the like, that are portable and easily attachable and detachable.

A fifth objective of the present invention is to provide illumination apparatus, devices and methods of attaching lights to outdoor umbrellas, tree branches, porches, balconies, gazebos, and the like, that is easily attachable and detachable.

A sixth objective of the present invention is to provide illumination apparatus, devices and methods of attaching lights to outdoor umbrellas, tree branches, porches, balconies, gazebos, and the like, where the lights can be adjustably aimed.

A preferred embodiment of the portable light source can consist of a housing having an upper half section with an upper exposed surface, and a lower half section with a bottom exposed surface, an expandable clip for attaching the housing to a narrow support structure, a solar cell mounted in the upper exposed surface of the housing, and a light source located in the bottom exposed surface and being powered by the solar cell, the light source being aimed downward from the housing.

A compartment in the housing with a removable cover can support a removable rechargeable battery, such as double AA batteries, wherein the solar cell allows for the battery to be recharged during daylight hours.

The light source can include light emitting diodes (LEDs), such as white and/or colored LEDS. A focusing lens cover that can include a a dome shaped magnifying lens can be positioned over an exposed portion of the light source. A pivotable/rotatable that can be operated by a turning switch can allow for the base to pivot, which can aim the light beam along an arc direction below the housing The expandable clip can include a spring for biasing the clip in a closed position wherein the upper half section is adjacent to the lower half section, the clip having an open position wherein a forward portion of the upper half section and a forward portion of the lower half section are spaced apart from one another. The expandable clip can include an upper handle portion rearwardly extending from the upper half section, a lower handle portion rearwardly extending from the lower handle portion, and a pivot portion for pivotably attaching the upper half section to the lower half section, wherein the spring biases the pivot portion so that the upper half section and the lower half section are in the closed position with the upper half section.

At least one of the upper handle portion and the lower handle portion can have a gripping edge surface such as raised parallel gripping edges.

An on and off switch can be located on the bottom exposed surface of the lower half section of the housing.

The upper half section of the housing can include a photocell adjacent to a solar cell, wherein the photocell is for activating the light source darkened conditions.

The light source can be clipped about exposed fabric edges of an umbrella.

The light source can be clipped about other structures such as a tree branch.

Novel methods of clipping and unclipping the light source, and activating the light source and recharging battery power supplies are also described.

Further objects and advantages of this invention will be apparent from the following detailed description of the presently preferred embodiments which are illustrated schematically in the accompanying drawings.

BRIEF DESCRIPTION OF THE FIGURES

FIGS. 12A, 12B, 12C, and 12D are bottom views of the clip light with the battery cover being opened, batteries to be inserted inside, battery cover about to be closed and the battery cover in a closed position.

FIG. 13 is a side view of the clip light being opened to attach to an underlying structure.

FIG. 14 is a side view of the clip light attached to an umbrella.

FIG. 15 is a top view of the umbrella with attached clip light of FIG. 14.

DESCRIPTION OF THE PREFERRED EMBODIMENTS

Figure 1:
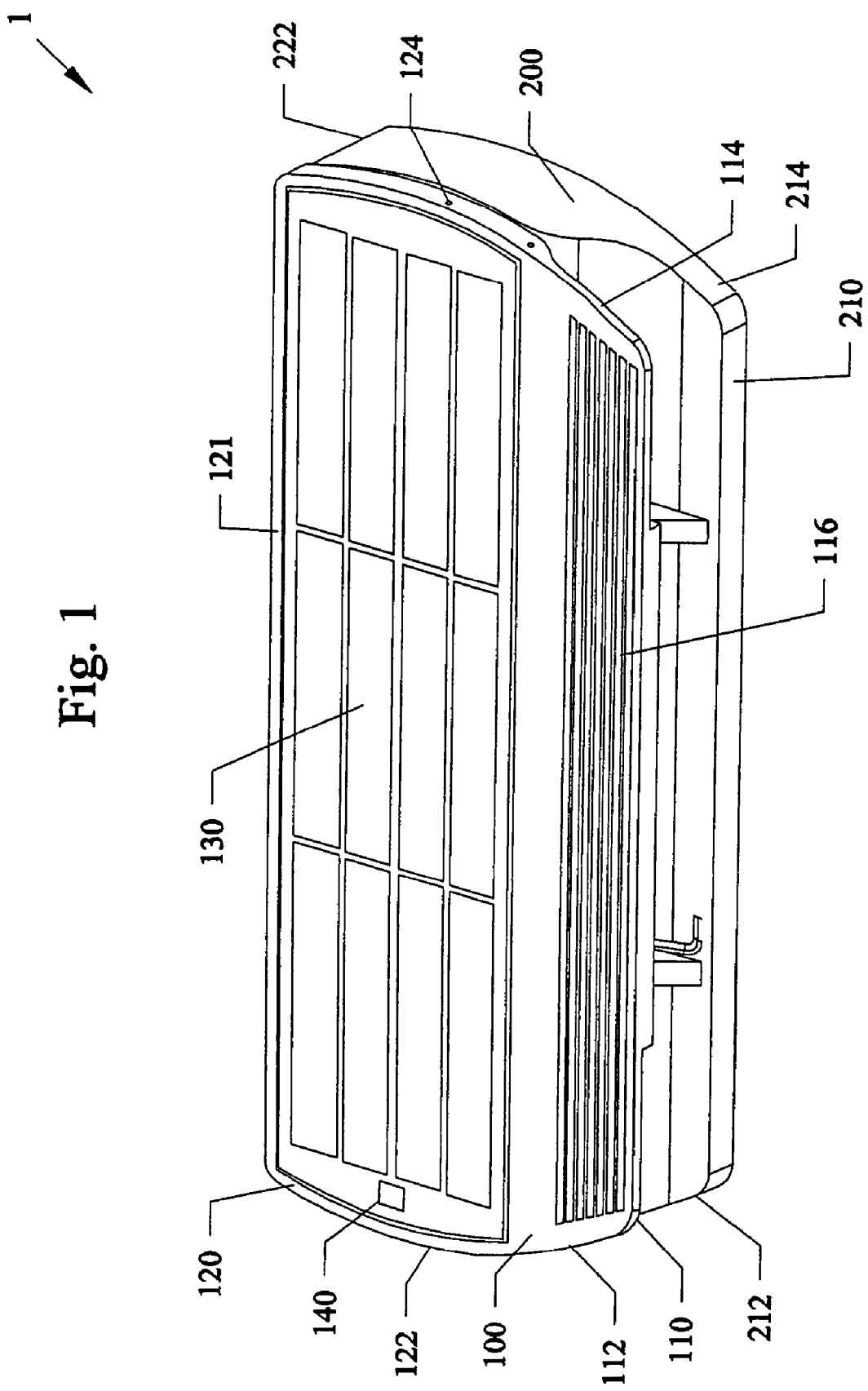
FIG. 1 is a perspective upper rear perspective view of the clip light invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components will now be described.
Housing 1
Upper Half Section 100
Rear end of cover lid 110
Curved side ends 112, 114
Raised or Grooved parallel gripping strips 116 on outer rear end
Pivot attach members for spring 118
Base of cover lid 120
Front end 121
Curved sides 122, 124
Solar panel 130
Photosensor 140
Inside front gripping plate 150
Gripping teeth/strips/grooves 156 on inner front plate
Lower Half Section 200
Rear end of bottom cover 210
Curved side ends 212, 214
Optional raised or grooved parallel gripping strips 216
Pivot attach members for spring 218
Base of cover lid 220
Front end 221
Curved sides 222, 224
Diffuser/lens 230
Light source(s)(LEDs) 235
Tiltable PCB(printed circuit board) base 240
PCB pivot rod 242
Tilting switch/wheel 245
PCB fixer(clip) 246
Interior mount flanges 248
Inside front gripping plate 250
Gripping teeth/strips/grooves 256 on inner front plate
Battery cover 260
Protruding raised edge tips 262
Mateable openings 263
Battery compartment 264
Batteries 265
On/off Switch 270
Spring 300
Pivot rod 350
Umbrella 400
Fabric 410
Edge of fabric 412
Struts 420
Pole 430
Table 440
Legs 450
Branch 500

Figure 2:
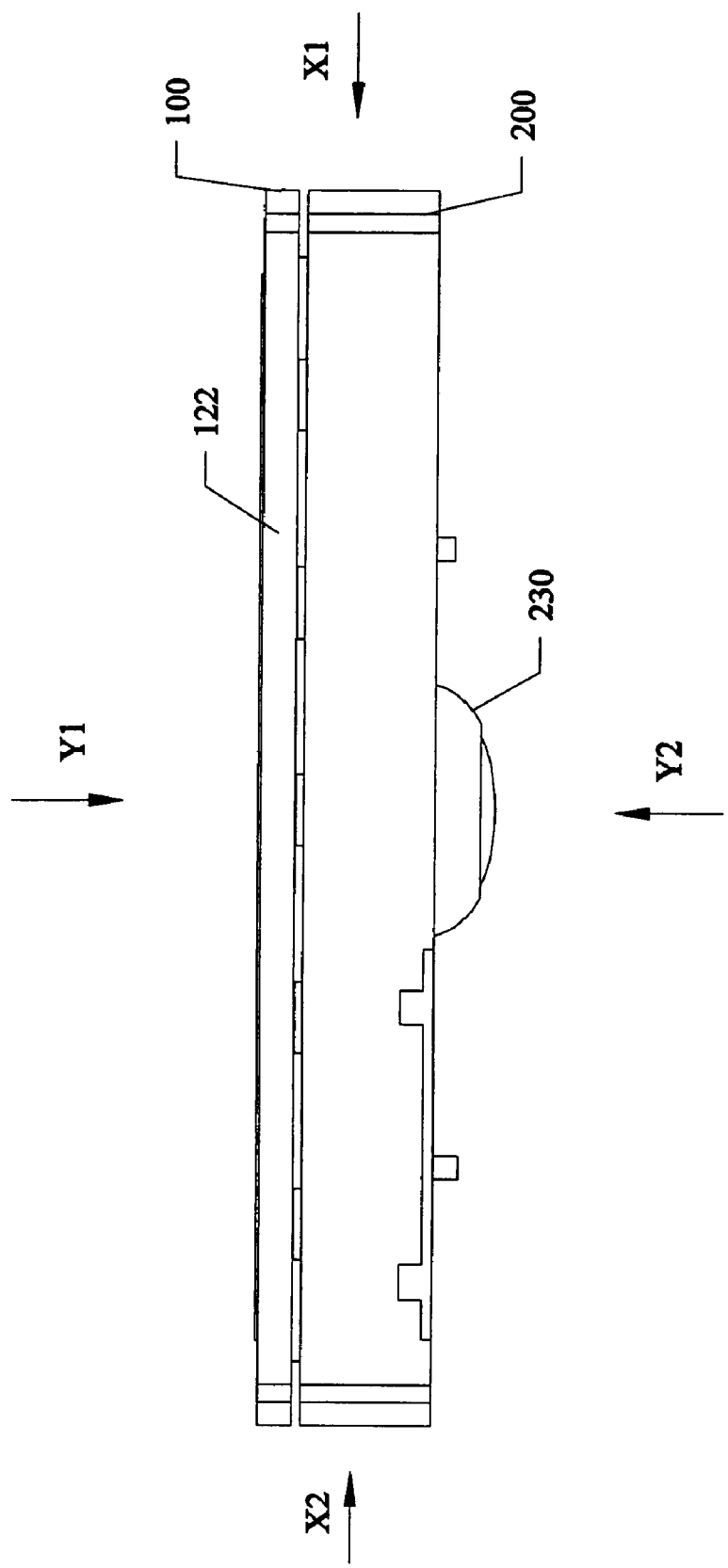
FIG. 2 is a front end view of the clip light of FIG. 1.
Figure 3:
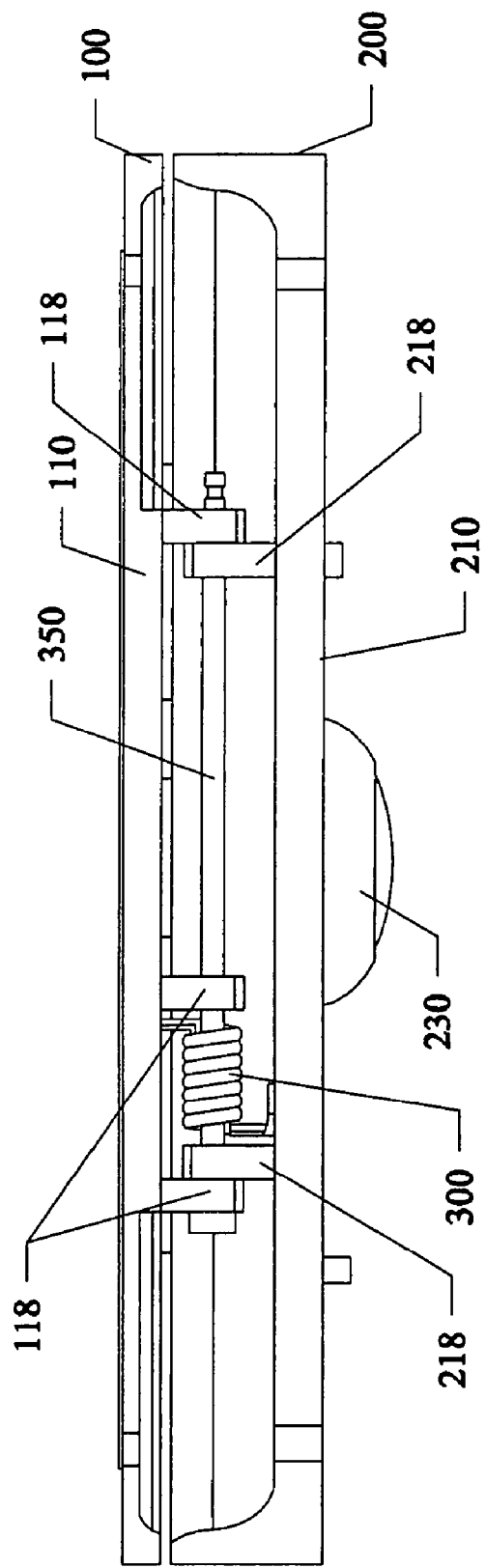
FIG. 3 is a rear end view of the clip light of FIG. 1.
Figure 4:
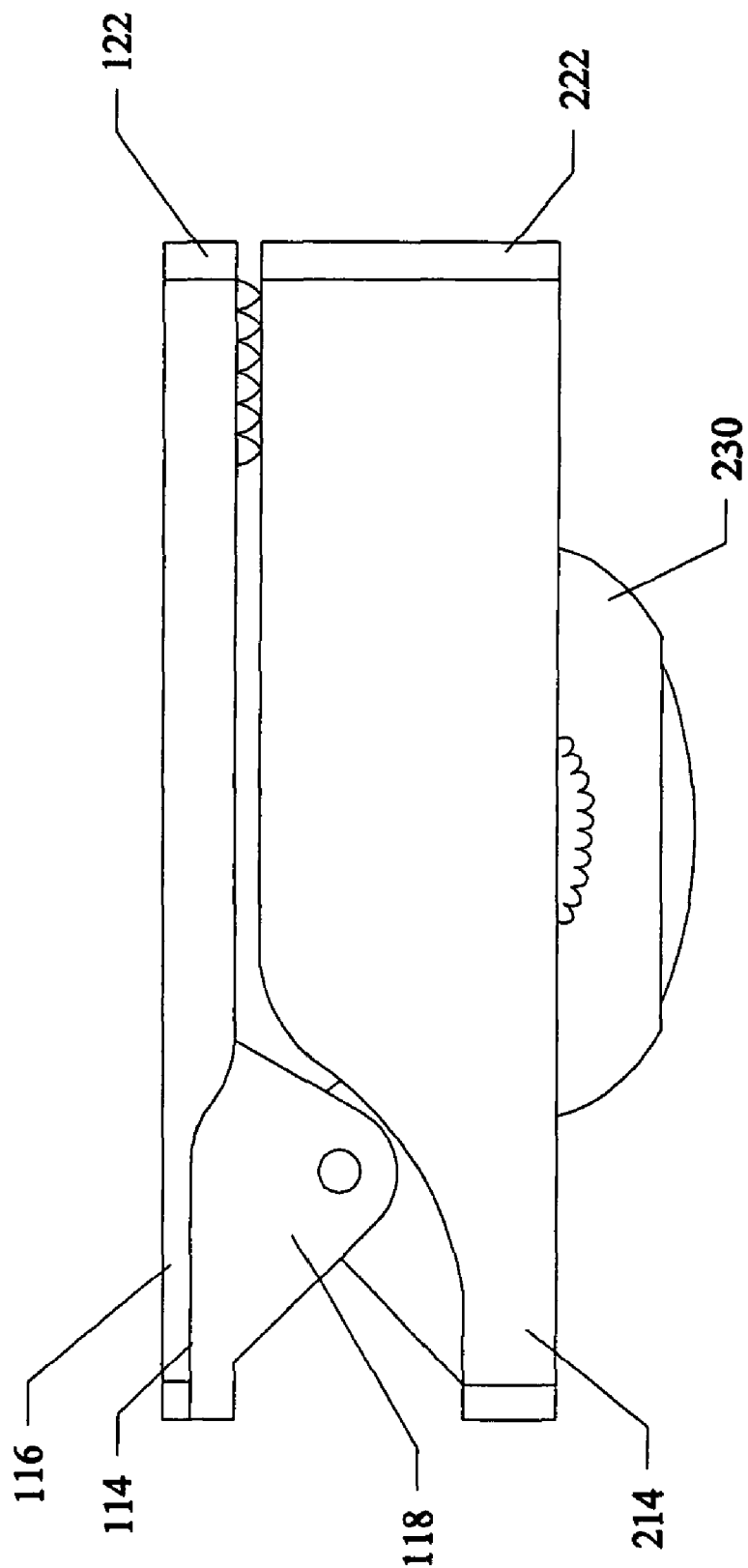
FIG. 4 is a right side view of the clip light of FIG. 2 along arrow X1.
Figure 5:
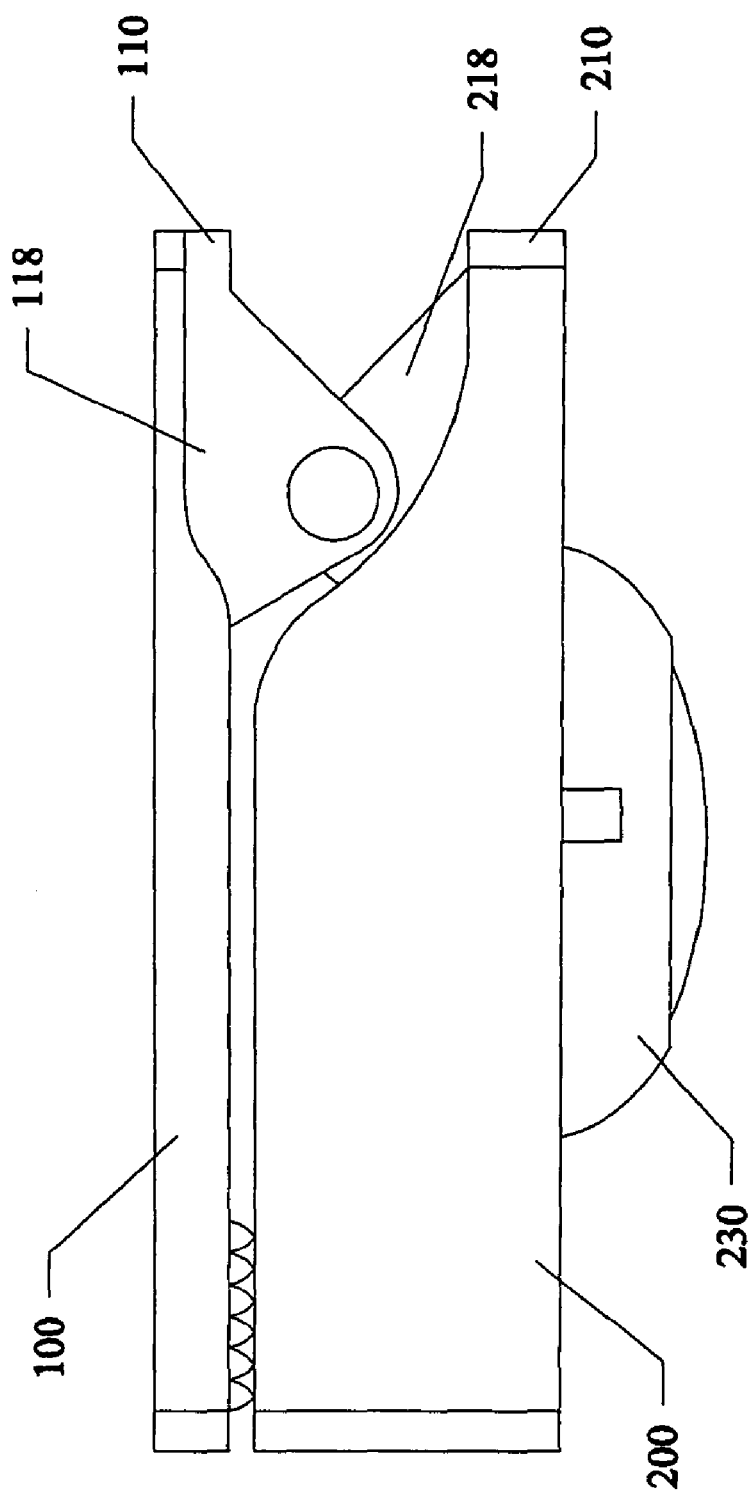
FIG. 5 is a left side view of the clip light of FIG. 2 along arrow X2.
Figure 6:
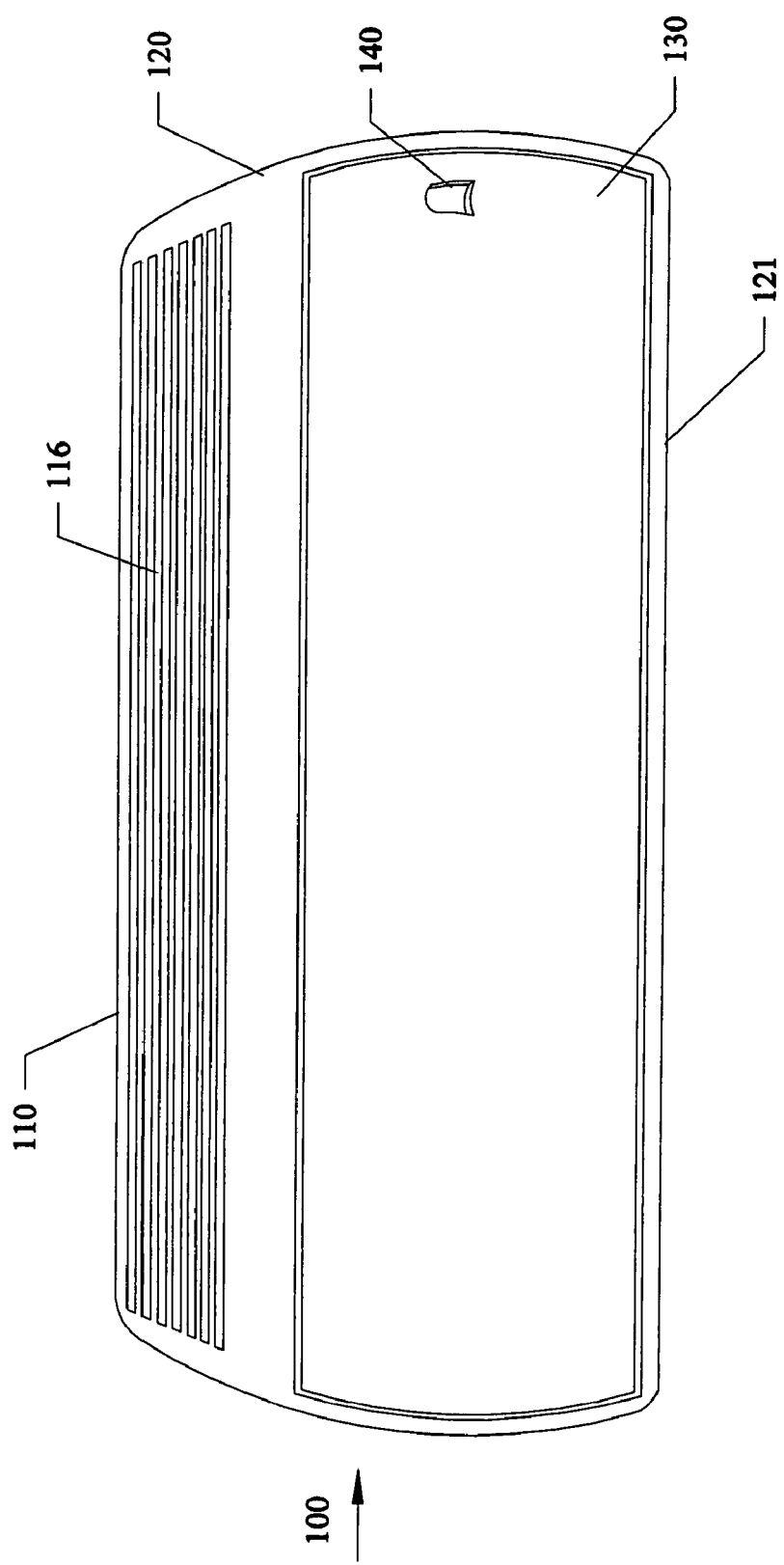
FIG. 6 is a top view of the clip light of FIG. 2 along arrow Y1.
Figure 7:
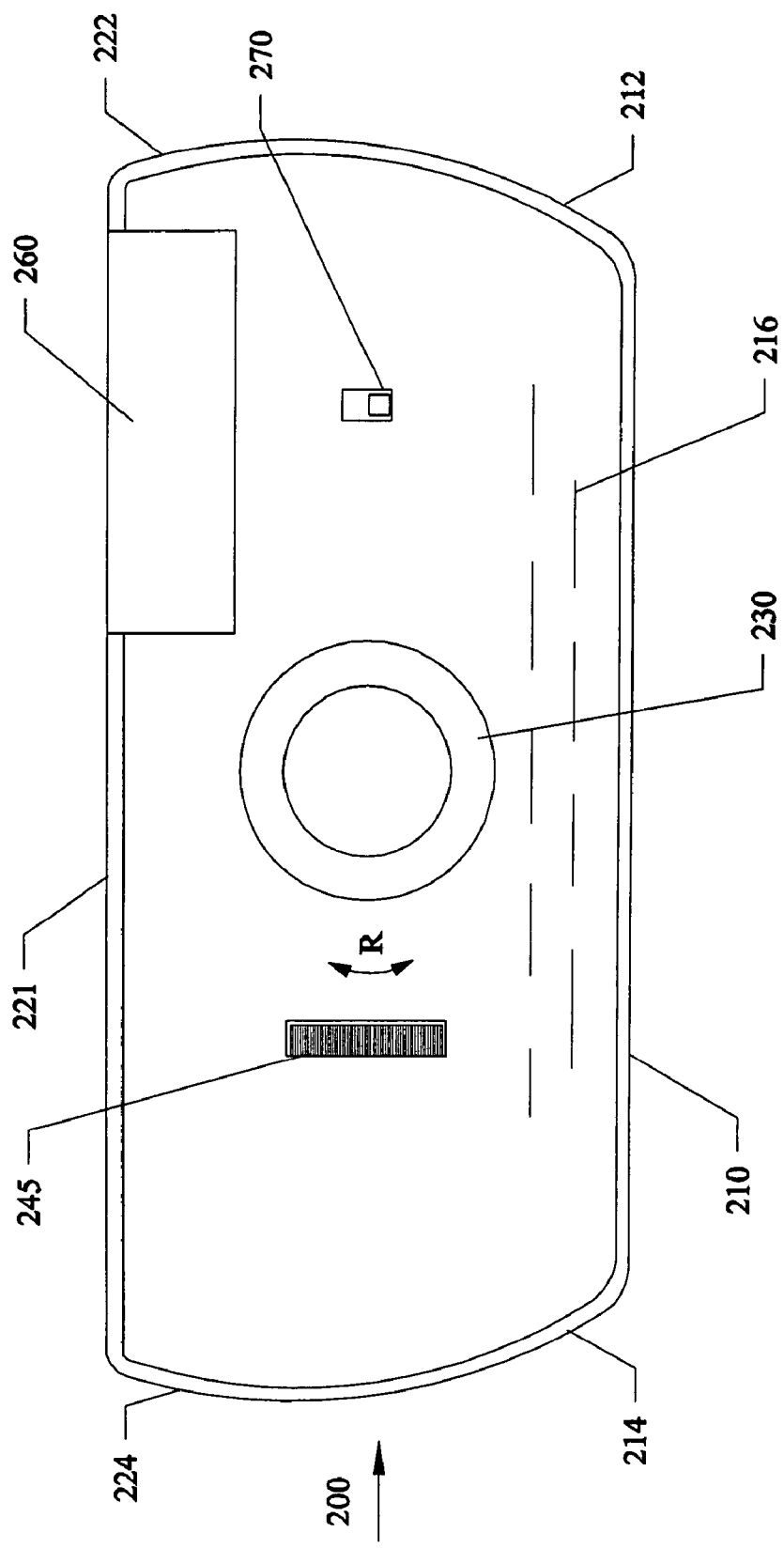
FIG. 7 is a bottom view of the clip light of FIG. 2 along arrow Y2.

FIG. 1 is a perspective upper rear perspective view of the clip light invention 1. FIG. 2 is a front end view of the clip light 1 of FIG. 1. FIG. 3 is a rear end view of the clip light 1 of FIG. 1. FIG. 4 is a right side view of the clip light 1 of FIG. 2 along arrow X1. FIG. 5 is a left side view of the clip light 1 of FIG. 2 along arrow X2. FIG. 6 is a top view of the clip light 1 of FIG. 2 along arrow Y1. FIG. 7 is a bottom view of the clip light 1 of FIG. 2 along arrow Y2.

Referring to FIGS. 1-7, the clip light invention 1, can have a generally rectangular configuration having a front side being approximately 6.75 inches long, a rear side being approximately 6 inches long, and a width of approximately 3 inches wide, and a thickness of approximately 1 inch thick, with an overall weight of approximately 7.8 ounces, which makes the device both compact and lightweight. The clip light device 1 includes an upper half section 100 pivotally attached to a lower half section 200, by upper half pivot flange members 118 and lower half pivot flange members 218 with a spring 300 therebetween on a pivot rod 350 (that passes through flange members 118, 218). The spring 300 biases the rear end 110 of the upper half section apart 100 from the rear end 210 of the lower half section 200 so that the clip light is in a closed position, which will be more fully described below.

The upper half section 100 forms a cover lid with a front end 121, curved front sides 122, 124 that each connect to respective rear curved side ends 112, 114 and a rear end 110. Across a rear outer surface of the upper half section 100 can be a gripping surface 116, that can include raised parallel narrow strips, or parallel grooved indentations. Across another outer surface portion 120 of the upper half section 100 can be a solar panel 130, which can run substantially across the length of the clip light 1 and have a length of approximately 6.67 inches by approximately 2 inches wide. A photosensor 140 can also be located in the outer surface portion 120.

The lower half section 200 forms a bottom lid with a front end 221, curved front sides 222, 224 that each connect to respective rear curved side ends 212, 214 and a rear end 210. An optional gripping surface 216 can be provided across rear outer surface of the lower half section 200, which is similar to the upper gripping surface 116. Extending downward from the lower half section can be a diffuser/lens 230 that covers a light source 235, such as light emitting diodes 235. The diffuser/lens can have a somewhat dome shape that generally focuses a light beam that emits from the light source 235. Also on the outer surface of the bottom lid can be a rotatable switch 245 which adjusts a tilt angle of the light source 235 so that rotating the switch tilts the light source to emit beams along different arc directions of an approximately 145 degrees.

Also on the outer surface of the bottom lid can be a battery cover 260 that can be a snapable and/or pivotal cover that closes a battery compartment 264 thereunder. A power switch 270 such as but not limited to a toggle switch can turn on and turn off power to the light source 235.

Figure 8:
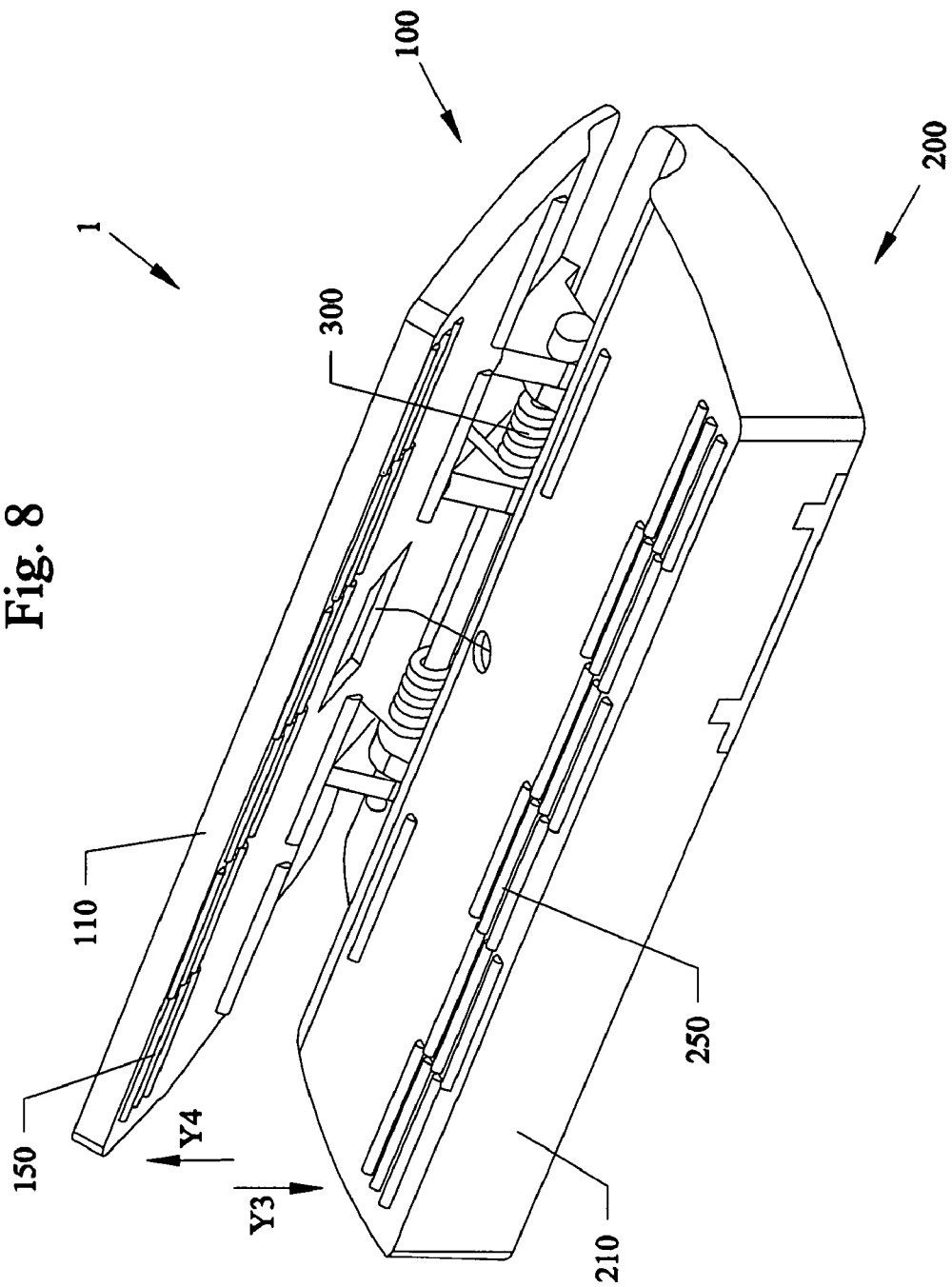
FIG. 8 is a perspective front view of the clip light of the above figures in an open position.
Figure 9:
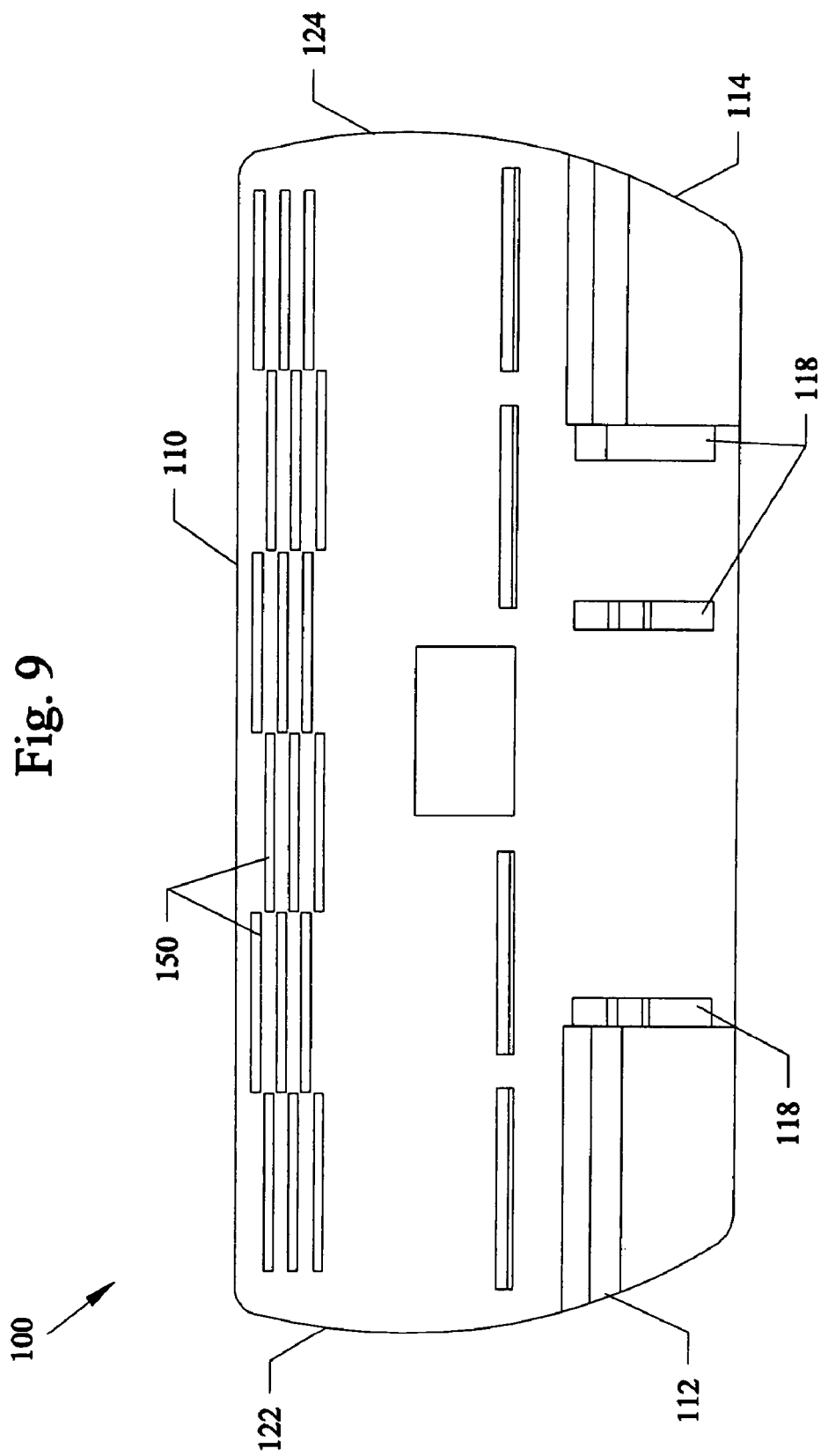
FIG. 9 is a top inside view of the open clip light of FIG. 8 along arrow Y4.
Figure 10:
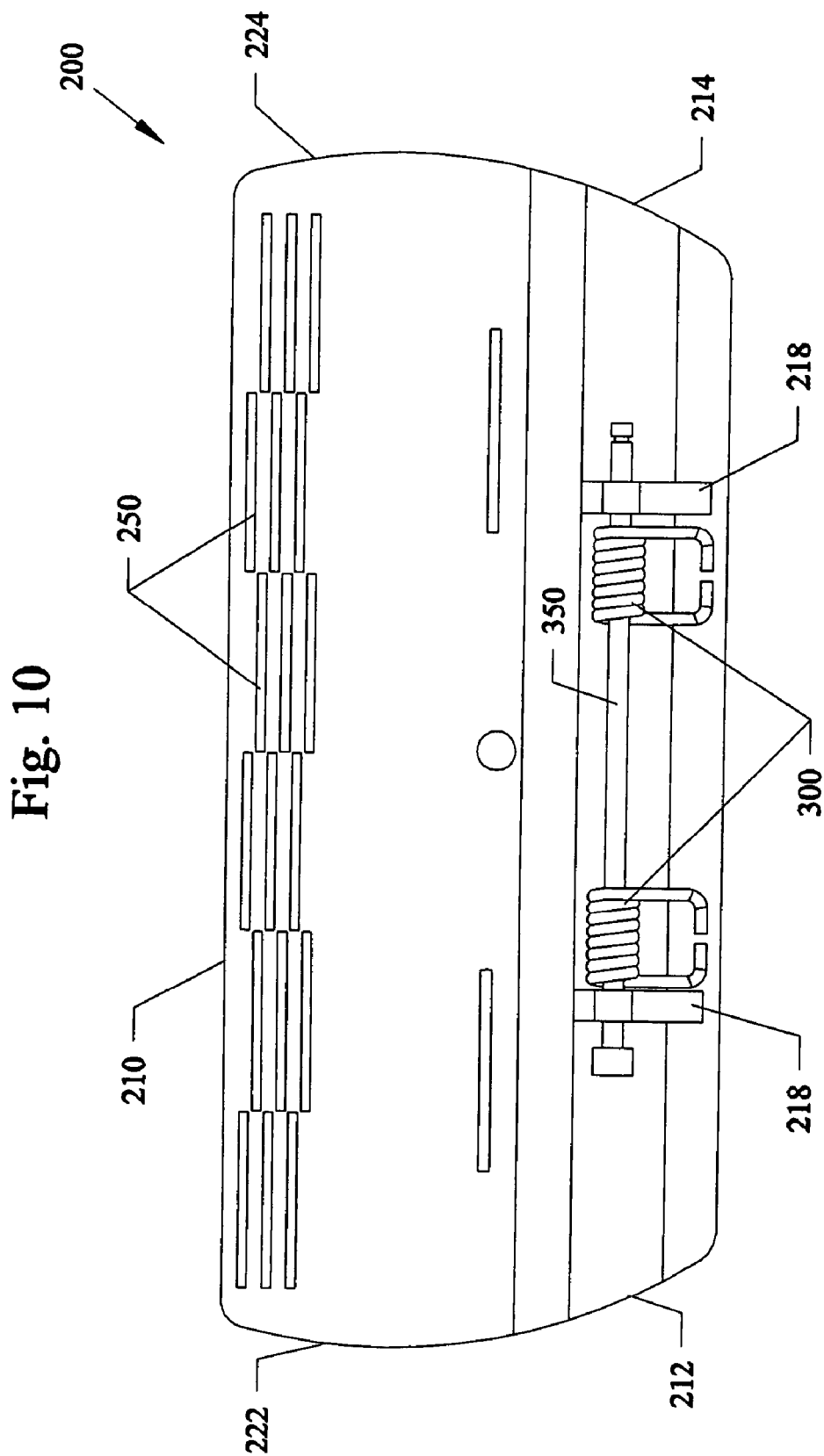
FIG. 10 is a bottom inside view of the open clip light of FIG. 8 along arrow Y3.
Figure 11:
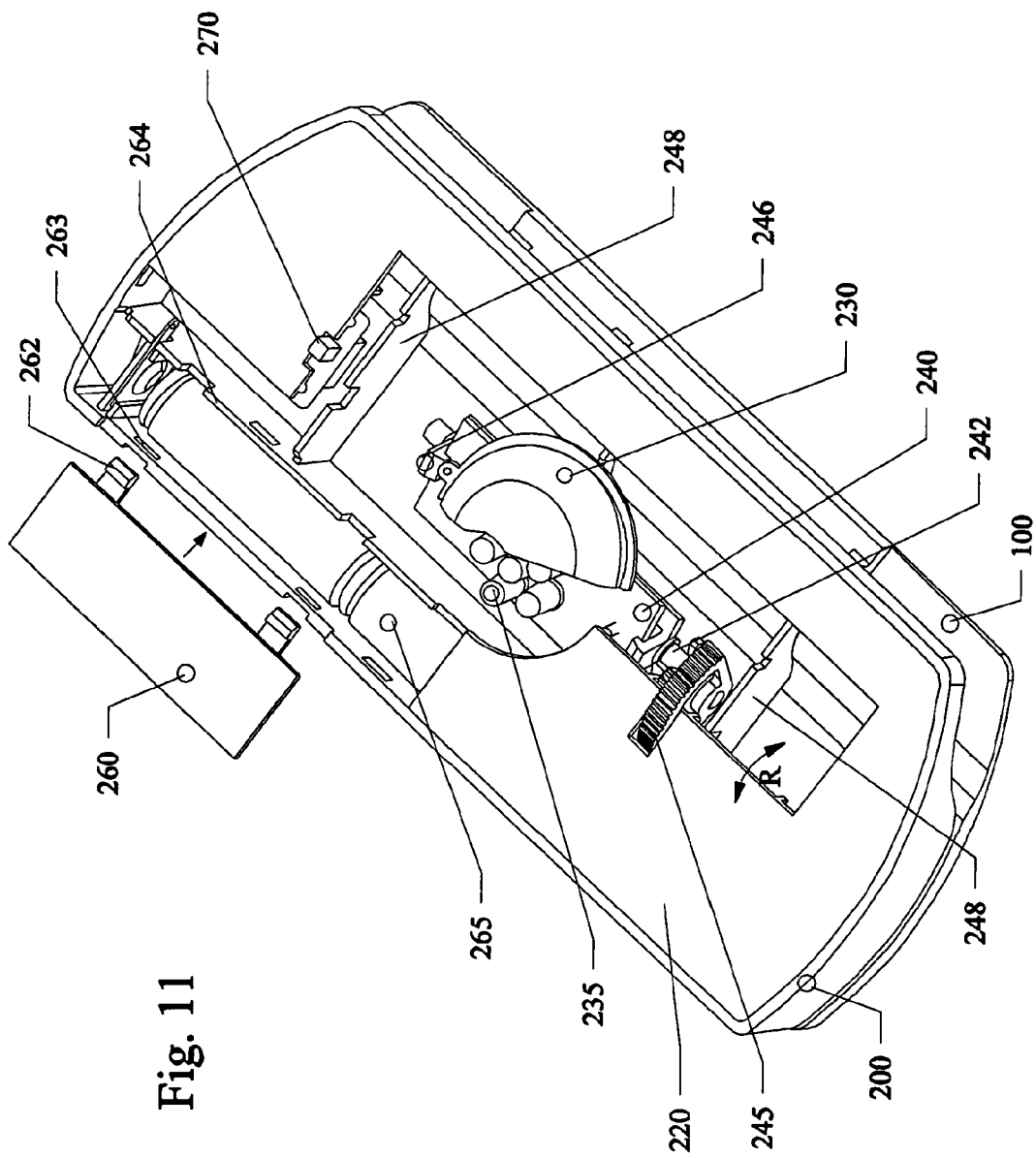
FIG. 11 is a partial cross-sectional bottom view of the clip light of the above figures.

FIG. 8 is a perspective front view of the clip light 1 of the above figures in an open position. FIG. 9 is a top inside view of the open clip light 1 of FIG. 8 along arrow Y4. FIG. 10 is a bottom inside view of the open clip light 1 of FIG. 8 along arrow Y3. FIG. 11 is a partial cross-sectional bottom view of the clip light 1 of the above figures.

FIGS. 12A, 12B, 12C, and 12D are bottom views of the clip light 1 with the battery cover 260 being opened, batteries 265 to be inserted inside, battery cover 260 about to be closed and the battery cover 260 in a closed position. Referring to FIGS. 11-12D, the battery cover 260 can slide into place with protruding raised edge tips 262 that snap into mateable openings 263 in the bottom half section 200. The battery cover can also be pivotally attached to snap into place to cover battery compartment 264

Referring to FIGS. 8-12D, upper half section 100 can include an inside front gripping plate 150. Lower half section 200 can include an inside front gripping plate 250. The gripping plates 150, 250 can include parallel raised offset rib members that interlock within one another so that the housing 1 in a closed position can wrap about a support surface, such as an umbrella material which will be described in detail later.

Referring to FIGS. 7 and 11, inside the lower half section 200 a light source 235, such as but not limited to a LED (light emitting diode(s)) can be mounted on a printed circuit board (pcb) 240. The opposite ends of the pcb 240 can be attached to a pcb pivot rod 242 by a pair of pcb fixers (clips) 246. Interior mount flanges 248 inside the lower half section 200 can support outer ends of the rotatable pivot rod 242. A tilting mechanism 245, such as but not limited to a tilting switch/wheel having raised outer raised grooves. A diffuser/lens 230 such as a dome shaped lens can be fixably mounted about an exterior opening in the lower half section 200 above the light source 235. The diffuser/lens 230 can focus the light emissions from the light source 235.

The operation of the clip device 1 will now be described in reference to FIGS. 1-12D. An operator can turn on power from batteries 265 to the light source 235 in the device 1 by power switch 270 with the light source being activated by the photosensor 140. When the power switch 270 is in an on position, lack of daylight (night-time conditions) can be detected by a top located photosensor 140, which will then turn the light source 235 on. The batteries 265 can be charged from sunlight that strikes the solar panel 130 during daylight hours, and the photosensor 140 does not activate the light source 235.

When the light source 235 is in an on position, the user can rotate the tilting mechanism 245 exposed from the bottom of the housing 1, in arc direction along arrow R, which rotates pivot rod 242 and pcb 240 supported light source 235 to direct a focused light beam from diffuser/lens 230.

FIG. 13 is a side view of the clip light 1 being opened to attach to an underlying structure. An operator can press on portions 116, 216 of the clip light to expand front ends 121 of upper half section 100 from front end 221 of lower half section 200.

FIG. 14 is a side view of the clip light attached to an umbrella 400. FIG. 15 is a top view of the umbrella 400 on pole 430 with table 440 that is supported above ground surface by table legs 450, with the attached clip light 1 of FIG. 14. Here, the opened clip light 1 can wrap about fabric edge 412 of the umbrella fabric 410 between struts 420. The upper gripping teeth 156 of upper half section 100 and the lower gripping teeth 256 of lower half section 200 can sandwich a portion of the umbrella fabric 410 therebetween. Adjusting the arc direction of the light 235 by the switch 245, previously described, can beam the light emission to a selected location beneath the umbrella 400. The operator can remove the clip light by compressing portions 116, 216 of the clip light 1 and pulling the clip light 1 away from the umbrella 400.

Figure 16:
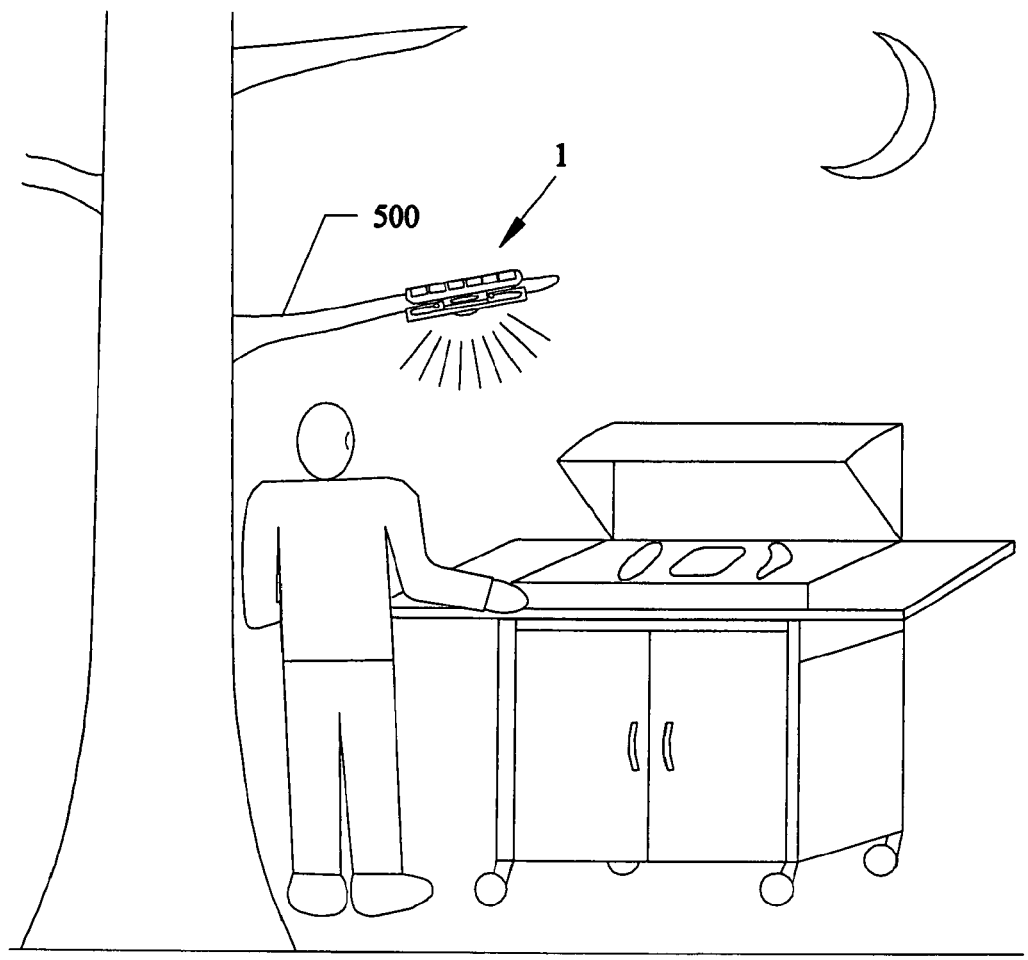
FIG. 16 is a side view of the clip light attached to a branch of a tree.

FIG. 16 is a side view of the clip light 1 attached to a branch of a tree 500 so that a light source can be used during night-time conditions and allow for outdoor activities to be visible, such as during a barbeque, and the like.

The clip light 1, can also be attached to other structures such as but not limited to attaching to a visor in a vehicle, such as an automobile, truck, and the like, as needed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of operating a portable light source, comprising the steps of:
    providing a housing having an upper half section with an upper exposed surface and a lower surface, and a lower half section with a bottom exposed surface and an upper surface, the lower surface of the upper half section having a front portion with a generally planar surface with raised members, and the upper surface of the lower half section having a front portion with a generally planar surface with raised members;
    pivoting a rear portion of the upper half section to a rear portion of the lower half section;
    biasing the housing into a closed position with a spring wherein the front portions of both the upper half section and the lower half section abut one another to form a clip;
    expanding the front portions of the upper half section from the lower half section by squeezing the rear portions of the upper half section and the lower half section together;
    recharging a battery inside the housing by a solar cell mounted in the upper exposed surface of the housing;
    mounting a light source to a pivotable base in the lower half section;
    powering the light source on the bottom of the housing from the battery;
    emitting light from the light source below the housing;
    aiming the emitted light along different arc directions by rotating a rotatable wheel with serrated edges mounted in a rectangular opening in the bottom exposed surface of the lower half section, the rotatable wheel attached to the lower half section by a pivot rod axis inside the lower half section, the pivot rod axis being attached to the pivotable base of the light source, the wheel having an upper portion which remains above the bottom exposed surface of the lower half section, and a lower portion which remains exposed out of the rectangular opening and beneath the bottom exposed surface of the lower half section, wherein rotating the wheel by exposed portions of the serrated edges of the wheel rotates the light source to aim the light source along different arc directions downward from the bottom exposed surface of the lower half section of the housing;

clipping the housing about a support structure that is positioned between the front portions of the upper half section and the lower half section.

2. The method of claim 1, further comprising the step of:
activating the light source during dark environmental conditions with a photocell.

3. The method of claim 1, further comprising the step of:
opening a lid that cover an opening to a battery compartment in the housing;

removing the battery through the opening in the housing; and replacing the rechargeable battery by inserting another battery into the compartment; and closing the opening to the compartment by snapping the lid over the opening.

4. The method of claim 1, wherein the support structure is a portion of an umbrella.

5. The method of claim 4, wherein the portion of the umbrella is an outer perimeter fabric edge about an opened umbrella.

6. The method of claim 5, wherein the clipping step includes the step of:
clamping the raised members on the front portion of the lower surface of the upper half section and the raised members on the front portion of the upper surface of the lower half section to both sides of the outer perimeter fabric edge of the opened umbrella, so that the outer perimeter fabric edge of the opened umbrella is gripped by and sandwiched between the upper half section and lower half section.

7. The method of claim 1, wherein the support structure is a tree branch.

8. The method of claim 1, further comprising the step of:
magnifying the emitted light with a dome shaped magnifying lens.

9. The method of claim 1, wherein the light source is an LED (light emitting diode).

10. A method of operating a portable light source, comprising the steps of:

providing a housing having an upper half section with an upper exposed surface and a lower surface, and a lower half section with a bottom exposed surface and an upper surface, the lower surface of the upper half section having a front portion with a generally planar surface, and the upper surface of the lower half section having a front portion with a generally planar surface;

pivoting a rear portion of the upper half section to a rear portion of the lower half section;

biasing the housing into a closed position with a spring wherein the front portions of both the upper half section and the lower half section abut one another to form a clip;

expanding the front portions of the upper half section from the lower half section by squeezing the rear portions of the upper half section and the lower half section together;

recharging a battery inside the housing by a solar cell mounted in the upper exposed surface of the housing;

powering a light source on the bottom of the housing from the battery;

emitting light from the light source below the housing; and clamping the front portion of the lower surface of the upper half section and the front portion of the upper surface of the lower half section to both sides of an outer perimeter fabric edge of an opened umbrella, so that the outer perimeter fabric edge of the opened umbrella is gripped by and sandwiched between the upper half section and lower half section.

11. The method of claim 10, further comprising the steps of:

mounting the light source to a pivotable base in the lower half section; and aiming the emitted light along different arc directions by rotating a rotatable wheel with serrated edges mounted in a rectangular opening in the bottom exposed surface of the lower half section, the rotatable wheel attached to the lower half section by a pivot rod axis inside the lower half section, the pivot rod axis being attached to the pivotable base of the light source, the wheel having an upper portion which remains above the bottom exposed surface of the lower half section, and a lower portion which remains exposed out of the rectangular opening and beneath the bottom exposed surface of the lower half section, wherein rotating the wheel by exposed portions of the serrated edges of the wheel rotates the light source to aim the light source along different arc directions downward from the bottom exposed surface of the lower half section of the housing.

* * * * *